United States Patent [19]
Doi et al.

[11] Patent Number: 5,509,112
[45] Date of Patent: Apr. 16, 1996

[54] PRESENTATION SUPPORT ENVIRONMENT SYSTEM

[75] Inventors: Miwako Doi; Ikiko Nishida, both of Kawasaki; Yoichi Sadamoto, Urayasu, all of Japan

[73] Assignee: Kabushiki Kaisha Toshiba, Kawasaki, Japan

[21] Appl. No.: 248,554

[22] Filed: May 24, 1994

Related U.S. Application Data

[63] Continuation of Ser. No. 763,502, Sep. 20, 1991, abandoned.

[30] Foreign Application Priority Data

Sep. 21, 1990 [JP] Japan .................................. 2-250160

[51] Int. Cl.$^6$ .................................................. G06T 11/20
[52] U.S. Cl. .................................................. 395/140
[58] Field of Search .................................. 395/129, 127, 395/140, 141, 152, 147; 340/724, 725; 345/127, 131, 140

[56] References Cited

U.S. PATENT DOCUMENTS

| | | | |
|---|---|---|---|
| 4,604,718 | 8/1986 | Norman et al. | 364/578 |
| 4,862,392 | 8/1989 | Steiner | 395/127 |
| 5,214,758 | 5/1993 | Ohba et al. | 395/164 |

OTHER PUBLICATIONS

B. Kleiner et al, "Representing Points in Many Dimensions by Trees and Castles", Jun. 1991, pp. 260–276.
Quattro Pro User's Guide, 1989, pp. 319, 326, 354, 355, 376.
Mills, "Design View Links Geometry and Equations", Computer Aided Engineering, Sep. '89, p. 2.
Keith Waters, "A Muscle Method for Animating Three-dimensional Facial Expression", Computer Graphics SIGGRAPH, 1987, pp. 17–24.
Menachem Halmann et al, "Microcomputer Based System for 3D Reconstruction, Simulation and Dynamic Animation of the Heart", 1989.
Wolf Hersch, "Animated Graphics Old and New Technologies", 1988, pp. 9/1–9/4.

Primary Examiner—Mark K. Zimmerman
Assistant Examiner—Cliff N. Vo
Attorney, Agent, or Firm—Oblon, Spivak, McClelland, Maier & Neustadt

[57] ABSTRACT

A presentation support environment system. Logical natures and constraints of arrangements, structures, or the like of elements (components and backgrounds) constituting a presentation reference, semantic natures and constraints obtained by causing men to sense these elements, and quantitative natures and constraints of the elements are prepared as knowledge in a system in advance. A drafter (presenter) of the presentation reference designates content items and attributes of the presentation reference. These points are emphasized in the content, a degree of emphasis (priority), by designating the items and attributes. Parameters for specifying various components and backgrounds constituting the presentation reference are determined such that various constraints of the system are satisfied. A practical presentation reference is generated in accordance with the parameters. The natures and constraints of the elements constituting the presentation reference are expressed to have a plurality of solutions.

30 Claims, 19 Drawing Sheets

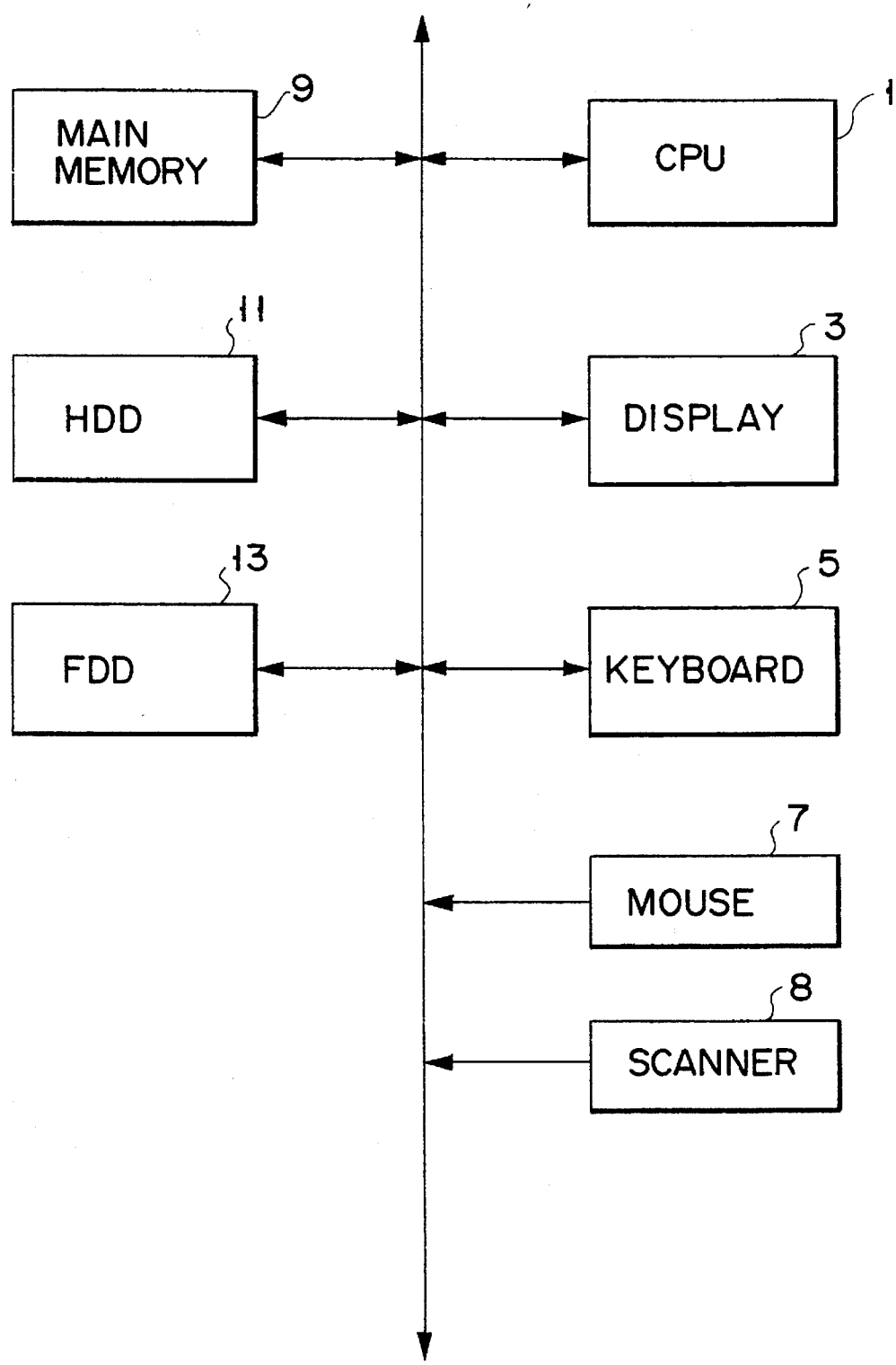
F I G. 1

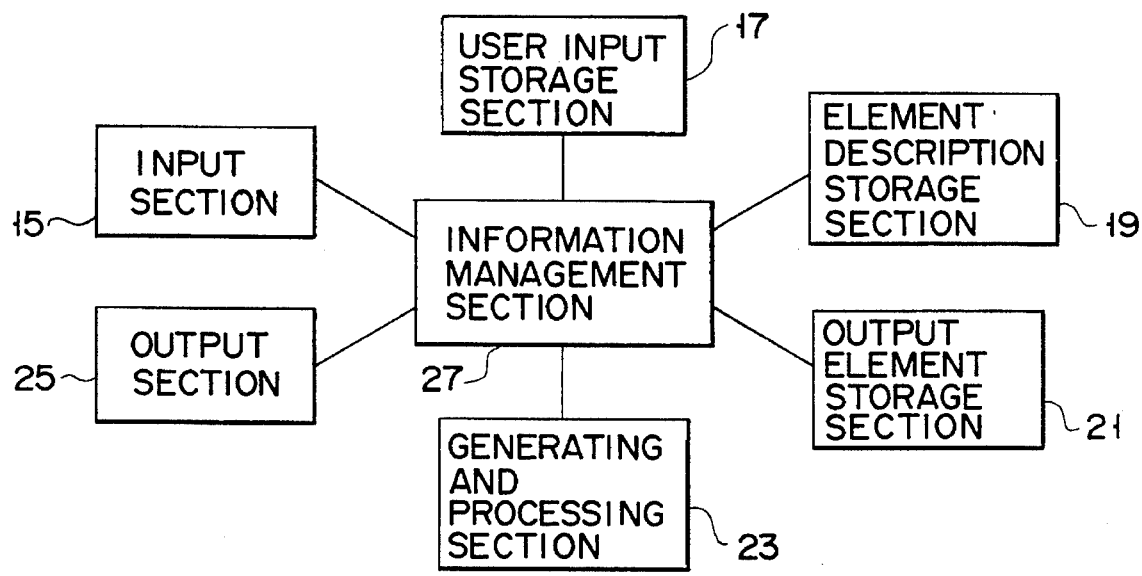
F I G. 2
| YEAR<br>COMPANY | 1980 | 1985 | 1990 | 1995 |
|---|---|---|---|---|
| A | 10 | 20 | 35 | |
| B | 15 | 20 | 25 | |
| C | 20 | 25 | 30 | |
F I G. 3

```
(COMPANY A
  (IMPORTANCE:1)
  (YEAR:1980
    (IMPORTANCE:3)
    (VALUE:10)
    (UNIT
      (VALUE MILLIONS)
      (ATTRIBUTE AMOUNT)
    (ATTRIBUTE YEAR)
  (YEAR:1985
    (IMPORTANCE:2)
    (VALUE:20)
    (UNIT
    (VALUE MILLIONS)
    (ATTRIBUTE AMOUNT)
    (ATTRIBUTE YEAR)
  (YEAR:1990
    (IMPORTANCE 1)
    (VALUE 35)
    (UNIT
    (VALUE MILLIONS)
    (ATTRIBUTE AMOUNT)
    (ATTRIBUTE YEAR)
(ATTRIBUTE ENTERPRISE
```

FIG. 4A

```
(COMPANY B
  (IMPORTANCE:3)
  (YEAR:1980
    (IMPORTANCE:3)
    (VALUE 15)
    (UNIT
    (VALUE MILLIONS)
    (ATTRIBUTE AMOUNT)
    (ATTRIBUTE YEAR)
  (YEAR:1985)
    (IMPORTANCE:2)
    (VALUE 20)
    (UNIT
    (VALUE MILLIONS)
    (ATTRIBUTE AMOUNT)
    (ATTRIBUTE YEAR)
  (YEAR:1990
    (IMPORTANCE:1)
    (VALUE 25)
    (UNIT
    (VALUE MILLIONS)
    (ATTRIBUTE AMOUNT)
    (ATTRIBUTE YEAR)
(ATTRIBUTE ENTERPRISE)
```

FIG. 4B

```
(COMPANY C
   (IMPORTANCE:2)
   (YEAR: 1980
      (IMPORTANCE:3)
      (VALUE 20)
      (UNIT
         (VALUE MILLIONS)
         (ATTRIBUTE AMOUNT)
      (ATTRIBUTE YEAR
   (YEAR: 1985
      (IMPORTANCE:2)
      (VALUE 25)
      (UNIT
         (VALUE MILLIONS)
         (ATTRIBUTE AMOUNT)
      (ATTRIBUTE YEAR)
   (YEAR: 1990
      (IMPORTANCE: 1)
      (VALUE 30)
      (UNIT
         (VALUE MILLIONS)
         (ATTRIBUTE AMOUNT)
      (ATTRIBUTE YEAR)
   (ATTRIBUTE ENTERPRISE)
```

F I G. 4C

```
(CLASS HUMAN BEING
  (COMPONENTS (HEAD, RIGHTHAND, LEFT HAND,
               TRUNK, RIGHT LEG, LEFT LEG,
               HEIGHT)

(CONSTRAINT 1
 HEIGHT = LENGTH OF HEAD + LENGTH OF TRUNK
          + LENGTH OF LEG)
(CONSTRAINT 2
  LENGTH OF HAND = LENGTH OF RIGHT HAND
                 = LENGTH OF LEFT HAND)
(CONSTRAINT 3
  LENGTH OF LEG = LENGTH OF RIGHT LEG
                = LENGTH OF LEFT LEG )
(CONSTRAINT 4 ;(*)
  HEIGHT x $\alpha_0$ ≦ WIDTH OF TRUNK ≦ HEIGHT x $\beta_0$)
(ATTRIBUTE (LIVING THING))
(ROLE (BAR, RUNNER, BLOCK))
(ORIGIN
  (VALUE (NIL)))
(DIRECTION       (VALUE (NIL)))
(NORMAL DIRECTION    (VALUE (NIL)))

(CLASS HEAD
  (COMPONENTS (LENGTH, WIDTH, COLOR, EXPRESSION,
               SHAPE )
(CONSTRAINT 1: (*)
    LENGTH x $\alpha_1$ = WIDTH = LENGTH x $\beta_1$ )
(CONSTRAINT 2 : (*)
  (HEIGHT, LENGTH) x $\gamma_1$ ≦ LENGTH = (HEIGHT, LENGTH) x $\gamma_2$
(ATTRIBUTE (LIVING THING))
(ROLE (BAR BLOCK))
(PRIORITY (3, 4)
```

F I G. 5A

```
(CLASS HEIGHT
  (COMPONENT (LENGTH))
  (PRIORITY (1,2)))

(CLASS : LEG
  (COMPONENTS (LENGTH, WIDTH,
              COLOR, SHAPE))
  (CONSTRAINT 1 : (*)
    LENGTH x $\alpha_1 \leq$ WIDTH $\leq$ LENGTH x $\beta_1$))
       ₹
  (ATTRIBUTE (LIVING THING))
  (ROLE (BAR, BLOCK))
  (PRIORITY (4, 1))
       ₹
  (CLASS LENGTH
  (QUANTITY REPRESENTATION : 2)
  (QUALITY REPRESENTATION NIL)
  (NAME REPRESENTATION : 4)
  (PRIORITY : 1)
  (ATTRIBUTE (ABSTRACT))
  (ROLE NIL)
  (INSTANCE NIL)
       ₹
```

FIG. 5B

```
(CLASS SHAPE
   (QUANTITY REPRESENTATION NIL)
   (QUALITY   REPRESENTATION 10)
   (NAME REPRESENTATION)7)
   (PRIORITY 2)
   (ATTRIBUTE NIL)
   (ROLE NIL)
   (INSTANCE NIL)
        ⸑

⸑
(CLASS TURTLE
   (SUPER CLASS HUMAN BEING)

(CLASS RABBIT
   (SUPER CLASS HUMAN BEING)

(CLASS COURSE
    (COMPONENTS (POSITION, SHAPE, WIDTH,
                 COLOR, LENGTH)')
    (CONSTRAINT 1
      LENGTH x α1 ≦ WIDTH ≦ LENGTH x β1)
          ⸑
    (ATTRIBUTE (CONCRETE))

(CHARACTERS (RUNNER))
                   (OUTSIDE, INSIDE))
    (BACKGROUND (OUTSIDE, INSIDE))
          ⸑
```

F I G. 5C

| | LARGE CLASSIFICATION | SMALL CLASSIFICATION |
|---|---|---|
| ENTERPRISE | LIVING THING | HUMAN BEING |
| COMPANY A | LIVING THING | TURTLE |
| COMPANY B | LIVING THING | RABBIT |
| YEAR | ABSTRACT | NIL |
| AMOUNT | CONCRETE | COIN |
| ⌇ | ⌇ | ⌇ |

F I G. 6

| MASTER | CONNECTION 1 | CONNECTION 2 | STATE | CONNECTION RELATION |
|---|---|---|---|---|
| RIGHT ARM | RIGHT UPPER ARM | RIGHT LOWER ARM | NORMAL | ARM CONNECTION A |
| RIGHT ARM | RIGHT UPPER ARM | RIGHT LOWER ARM | RUNNING | ARM CONNECTION B |
| LEFT ARM | LEFT UPPER ARM | LEFT LOWER ARM | NORMAL | ARM CONNECTION A |
| LEFT ARM | LEFT UPPER ARM | LEFT LOWER ARM | RUNNING | ARM CONNECTION C |
| ⌇ | ⌇ | ⌇ | ⌇ | ⌇ |

F I G. 7

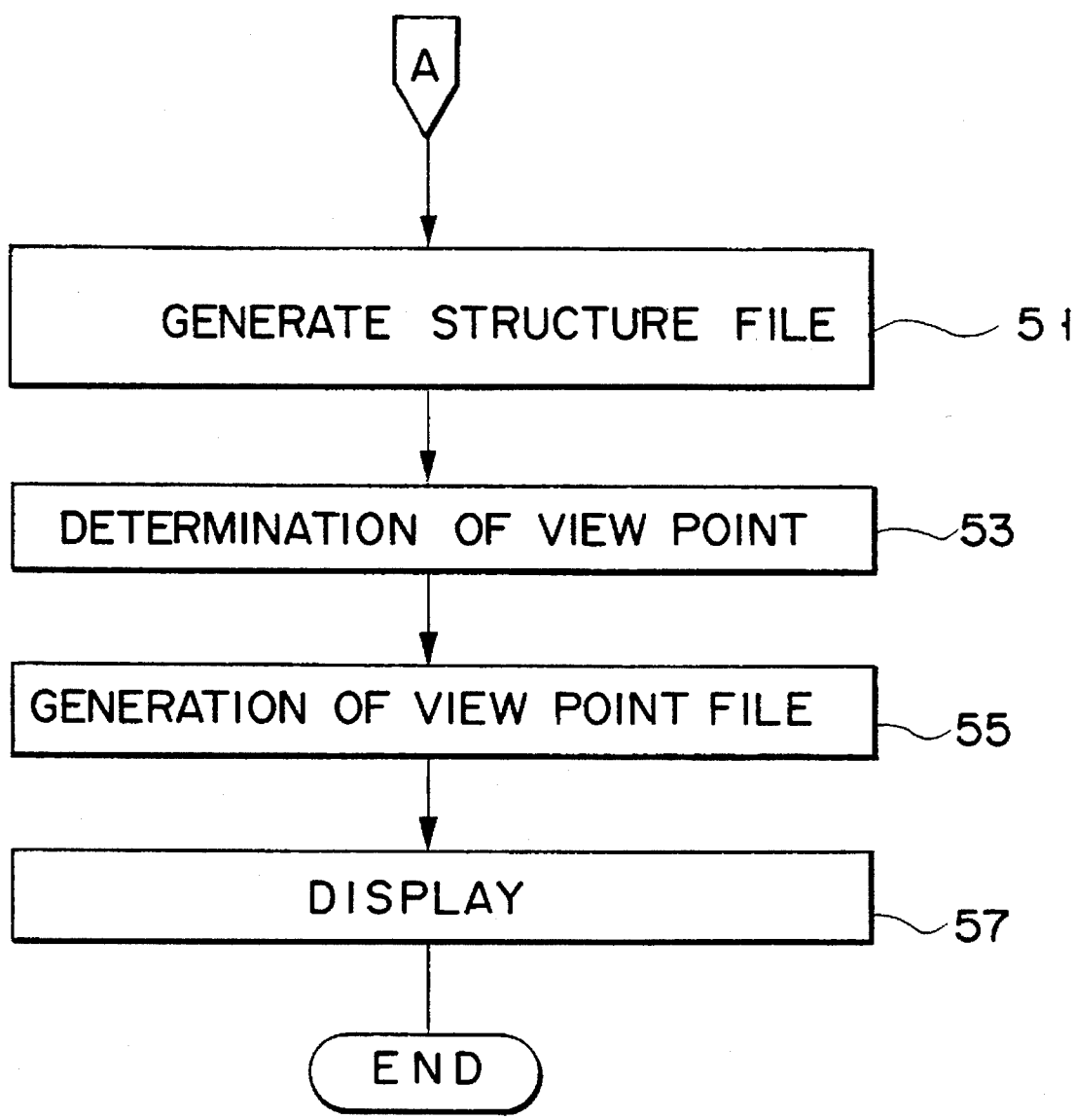
F I G. 10B

SCREEN EXAMPLE 1

"PLEASE SELECT DESIRED SCENE"

SCREEN EXAMPLE 2

"PLEASE SELECT CHARACTER"

| | |
|---|---|
| RULE 1 : | SELECT CORRESPONDING TO SMALL CLASSIFICATION |
| RULE 2 : | SELECT CORRESPONDING TO LARGE CLASSIFICATION |
| RULE 3 : | SELECT SMALL CLASSIFICATION CORRESPONDING TO SMALL CLASSIFICATION |
| RULE 4 : | SELECT LARGE CLASSIFICATION CORRESPONDING TO ATTRIBUTE |

FIG. 15

| | |
|---|---|
| RULE a : | DIFFERENT ELEMENT IS APPLIED FOR SAME ATTRIBUTE |
| RULE b : | SAME ELEMENT IS APPLIED FOR SAME ATTRIBUTE |

FIG. 16

| | |
|---|---|
| RULE $\alpha$ : | DISCRIMINATE AGAINST EXPRESSION |
| RULE $\beta$ : | DISCRIMINATE AGAINST COLOR |
| RULE $\gamma$ : | SCALING BASED ON DIFFERENCE |
| RULE $\delta$ : | PUT VIEW POINT AT GOAL POSITION |

FIG. 17

| | |
|---|---|
| RULE A : | PUT VIEW POINT AT START POSITION |
| RULE B : | SCALING BY INCREASING MAX VALUE |

FIG. 18

| EVENT | VIEW POINT POSITION | OBSERVING POINT | VIEW FIELD ANGLE | OBSERVING DIRECTION |
|---|---|---|---|---|
| SKI DESCENT | NEAR PREJUMP | PREJUMPING PLAYER | ONLY PLAYER | |
| | NEAR STEEP SLOPE | PLAYER ON STEEP SLOPE | | |
| SKI SLALOM GRAND SLALOM | NEAR AND SLIGHTLY BENEATH FLAG GATE | PLAYER PASSING THROUGH FLAG GATE | PLAYER AND FLAG GATE | SLIGHTLY LOW ANGLE |
| SWIMMING FREE STYLE | PARALLEL WITH PLAYER | LEADING PLAYER WHEN TAKING BREATH | LEADING PLAYERS | LATERAL |
| SWIMMING BREASTHSTROKE BUTTERFLY STROKE | COURSE FRONT | LEADING PLAYER WHEN TAKING BREATH | LEADING PLAYERS | FRONT |
| 100m DASH | LATERAL TO GOAL | TOP RUNNER | PLAYER RUNNING DEAD HEAT | LATERAL |
| MARATHON LONG DISTANCE | | GROUP OF FIRST LAP / TOP COMPETITION TACTICS OF PLAYERS / LAST RUNNER | TOP GROUP / TOP GROUP PLAYERS USING TACTICS / ONLY LAST RUNNER | |
| ~ | ~ | ~ | ~ | ~ |

FIG. 22

PRESENTATION SUPPORT ENVIRONMENT SYSTEM

This application is a continuation of application Ser. No. 07/763,502, filed on Sep. 20, 1991, now abandoned.

BACKGROUND OF THE INVENTION

1. Field of the Invention

The present invention relates to a system and method for generating multi-dimensional graphic data from input data including numerical data and, more particularly, to a presentation support environment system and method capable of easily and effectively preparing a presentation reference suitable for the intention and preference of a presenter.

2. Description of the Related Art

In recent years, as information processing techniques have been developed, various high-performance low-end information processing systems have been designed, and the systems have widely prevailed. In addition, various input/output devices are extensively developed, and a satisfactory man-machine interface is designed. Under these circumstances, computer graphics which are conventionally used for only making expensive commercial films have been attempted to be used for a variety of general presentations. The computer graphics can be applied for general use in a price and a processing speed.

When a computer graphics tool and a computer graphics system are used, operating techniques of the tool and system must be acquired first. It is, however, generally difficult to acquire these operating techniques, and a long time is required for acquiring the operating techniques. In addition, even if they are acquired, a presentation reference capable of clearly representing a theme cannot easily be prepared because of a poor capability (sense) for preparing the presentation reference. Therefore, it is difficult to sufficiently enhance a function of preparing the presentation reference.

For example, a presentation reference having an organization which is unbalanced as a whole is easily prepared, or a presentation reference having an unclear theme is easily prepared because information is excessively explained to minute levels. In contrast to this, when information is excessively omitted, a presentation reference having unclear contents may often be prepared.

A reason for causing the above conditions is described as follows. That is, although there are various constraints for completing a picture between elements constituting the presentation reference, the presentation reference is prepared without satisfaction of these various constraints.

Therefore, for example, a presentation reference must be prepared in sufficient consideration of balances of the sizes and colors of components and backgrounds constituting a presentation reference, the maximum number of elements capable of being sensed by men in one picture, and an element sensed by men as the most important element as a value of an ordinate in a graph is generally felt more important than a value of an abscissa.

Although a presenter who can prepare a good presentation reference generally has no clear consciousness of the above constraints, the presenter prepares a presentation reference without omitting the constraints so as to satisfy the constraints. In contrast to this, a presenter who cannot prepare a good presentation does not notice the constraints at all, fails to notice the constraints, or fails to satisfactorily set the constraints themselves. As a result, the presenter cannot prepare an impressive presentation reference in spite of his hardship.

In general, a new expressing method cannot be easily organized as a reference, and a lot of working hours are required for organizing the new method. Therefore, a large number of presentation references each having a certain tendency (pattern) are easily prepared, and routine presentations are often performed. For example, when a graphics tool capable of interactively making a bar graph or the like is used, since the size, the shape, the color, or the like of the bar graph cannot be almost set from a wide range of selection, a presentation reference highly tends to be prepared as a routine "picture".

In addition, even if there is a sample related to a new expressing method, it is very difficult to make a picture (presentation reference) with reference to the sample. For this reason, a presenter who is poor at use of illustrations and drawings often prepares a presentation reference using only verbal expressions. That is, in many cases, use of other expressions than the verbal expression is rejected only because operating techniques of shapes and ruled lines must be acquired to use graphic expressions.

A presenter who does not like the verbal expression often uses only block diagrams whatever the presenter explains. For this reason, in many cases, even when presentation contents are changed, presentation references represented by connecting boxes (blocks) (letters are described in the boxes) by lines and arrows are always prepared.

In a conventional computer graphics tool or a conventional computer graphics system, it is difficult to prepare a presentation reference in which a theme is effectively appealed, and the organizations of presentation references are similar to each other though the contents of the presentation reference are different from each other, thereby easily preparing tedious presentation references.

SUMMARY OF THE INVENTION

It is an object of the present invention to provide a presentation support environment system and method capable of easily and effectively preparing a presentation reference capable of effectively appealing a theme using knowledge related to logical, semantic, quantitative natures and constraints of components and backgrounds constituting the presentation reference.

According to the first aspect of the present invention, there is provided a system for displaying input data including numerical data as multi-dimensional graphic data, comprising: means for stacking the input data including the numerical data; means for inputting constrain conditions for displaying the input data as the multi-dimensional graphic data, the constrain conditions including at least data related to components and backgrounds used when the input data is displayed as the multi-dimensional graphic data; means for generating the multi-dimensional graphic data from the input data in accordance with the input constrain conditions; and means for displaying the generated multi-dimensional graphic data.

According to the second aspect of the present invention, there is provided a system for generating display data including graphic data from input data including numerical data, comprising: means for inputting constrain conditions used when the input data is displayed, the constrain conditions including at least data related to components and backgrounds used when the input data is displayed as the graphic data; means for hierarchically arranging the components constituting the graphic data and for forming a first link for linking the components of each layer; means for forming a second link for linking constrain conditions of each layer; means for combining components of the corresponding layer on the basis of the input constrain conditions and generating the display data including the graphic data; and means for displaying the generated display data.

According to the third aspect of the present invention, there is provided a method for displaying multi-dimensional graphic data from input data including numerical data, comprising the steps of: a) inputting constrain conditions used when the input data is displayed, the constrain conditions including at least data related to components and backgrounds used when the input data is displayed as the multi-dimensional graphic data; b) generating the multi-dimensional graphic data from the numerical data on the basis of the input constrain conditions; and c) displaying the generated multi-dimensional graphic data.

According to the fourth aspect of the present invention, there is provided a method for generating display data including graphic data from input data including numerical data, comprising the steps of: a) inputting constrain conditions used when the input data is displayed, the constrain conditions including at least pieces of information of components and backgrounds used when the input data is displayed as the graphic data; b) hierarchically arranging the components constituting the graphic data and forming a first link for linking the components of each layer; c) forming a second link for linking the constrain conditions of each layer; d) combining components of the corresponding layer on the basis of the constrain conditions input in the step a) and generating the display data including the graphic data; and e) displaying the generated display data.

According to the present invention, logical natures and constraints of arrangements, structures, or the like of elements (components and backgrounds) constituting a presentation reference, semantic natures and constraints obtained by causing men to sense these elements, and quantitative natures and constraints of the elements are prepared as knowledge in a system in advance. A drafter (presenter) of the presentation reference designates items and attributes of the content of the presentation reference, a point to be emphasized in the content and a degree of emphasis (priority), and the like. Parameters for specifying various components and backgrounds constituting the presentation reference are determined such that various constraints of the system are satisfied. A practical presentation reference is prepared and output in accordance with the parameters.

Therefore, even a presenter who is poor at preparation of a presentation reference can easily and effectively prepare a presentation reference capable of effectively appealing the intention of presentation contents without disturbance of various constraints which must be satisfied in the constitution of the presentation reference and without omitting these constraints.

In addition, since natures and constraints of elements of a presentation reference are expressed to have a plurality of solutions, a value obtained to satisfy the constraints need not be fixed to one value but can be set to be a value having a certain range. Therefore, even when data are input by the same user, a varied comprehensive presentation reference can be prepared. Therefore, preparation of a tedious presentation reference can be effectively prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a block diagram showing a presentation support environment system according to an embodiment of the present invention;

FIG. 2 is a block diagram schematically showing the presentation support environment system of the present invention;

FIG. 3 is a view showing an example of data including numerical data input by a user;

FIGS. 4A through 4C are views showing a description example of knowledge information stacked in a user input storage section shown in FIG. 2;

FIGS. 5A through 5C are views showing a description example of knowledge information stacked in an element description storage section shown in FIG. 2;

FIG. 6 is a view showing an example of user preference information stacked in the element description storage section shown in FIG. 2;

FIG. 7 is an example of pieces of information of components and backgrounds, constituting a presentation reference, stacked in an output element storage section shown in FIG. 2;

FIGS. 10A and 10B are flow charts showing whole processing in the presentation support environment system of the present invention;

FIGS. 15 through 18 are views showing rules used for preparation processing of a presentation reference.

FIG. 22 is a view showing knowledge used when a presentation reference is converted into an animation.

DETAILED DESCRIPTION OF THE PREFERRED EMBODIMENTS

Figure 9:
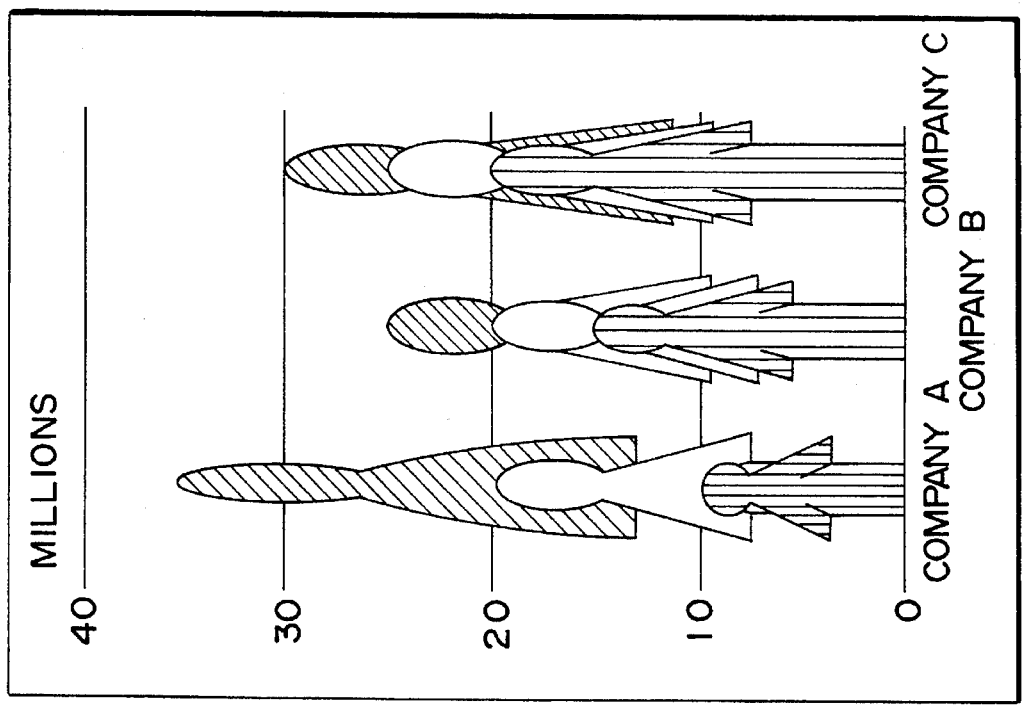
FIGS. 8 and 9 are views showing prepared presentation references.

A presentation support environment system according to an embodiment of the present invention will be described below with reference to the accompanying drawings.

FIG. 1 is a block diagram showing a presentation support environment system according to the present invention. As shown in FIG. 1, a central processing unit (CPU) 1 for controlling the system as a whole, a display 3 for displaying a presentation reference, a keyboard 5 and a mouse 7 for inputting constrain conditions such as components or backgrounds used when information related to a presentation reference or when the presentation is displayed on the display 3, a scanner 8 for reading the presentation reference, a main memory 9 for stacking a program executed by the CPU 1 and other data, and a hard disk drive (HDD) 11 and floppy disk drive (FDD) 13 for recording pieces of information related to a plurality of components or backgrounds are connected to each other through a system bus 14.

FIG. 2 is a view showing the concept of the presentation support environment system according to the embodiment of the present invention. An input section 15 constituted by a keyboard, a mouse, a scanner, and the like is used for the following applications. That is, contents to be presented shown in FIG. 3 are used for the following applications: i) pieces of information such as the names of items of the contents or numerical and non-numerical attributes are input; ii) information representing an intention of a presenter such as information representing a point to be emphasized by the presenter is input; iii) information representing preference of the presenter to elements constituting a presentation reference is input; and iv) a plan which seems to agree to the intention of the presentation is selected and designated from alternate plans of new presentation references which have never been used.

A user input storage section 17 stacks items related to the contents of the presentation reference input from the input section 15 or attributes of the items, pieces of information related to the intention of the presentation and preference of the presenter, or the like in accordance with the priority of these pieces of information in a description style which can be processed by a generating and processing section 5 (to be described later) as shown in FIGS. 4A through 4C. Note that, in an embodiment shown in FIGS. 4A through 4D, there are importances of enterprises and years.

An element description storage section 19 stacks various constraints. These constraints are as follows: i) a degree of balance of sizes and colors of components and backgrounds constituting a presentation reference; ii) an appropriate number of elements capable of being sensed by men in one picture; and iii) an element sensed by men as the most important element as a value of an ordinate in a graph is felt more important than a value of an abscissa. That is, logical natures and constraints of arrangements, structures, or the like of components and backgrounds constituting a presentation reference, semantic natures and constraints obtained by causing men to sense these elements, and quantitative natures and constraints of the elements are stacked in the element description storage section 19 to have allowable ranges in, e.g., a description style which can be processed by a generating and processing section 23 to be described later as shown in FIGS. 5A through 5C.

In addition, a pointer for practical element data or the name of pieces of information is described in the element description storage section 19 together with the above data such that data of an element practically output as a presentation reference can be called.

When so-called favorite information representing elements of the presentation reference which a presenter likes is input from the input section 15, the information is stacked in the element description storage section 19 in, e.g., a description style shown in FIG. 6.

An output element storage section 4 stacks pieces of information of components and backgrounds used for constituting a presentation reference to be output in practice in, e.g., a style as shown in FIG. 7, which can specify a connecting method between components in three-dimensional computer graphics. The pieces of information of the components and backgrounds which are practically output as the presentation reference and stacked in the output element storage section 21 are input and set in advance during design of the system or the like, independently of pieces of information input from a user (presenter) of the system.

Figure 8:
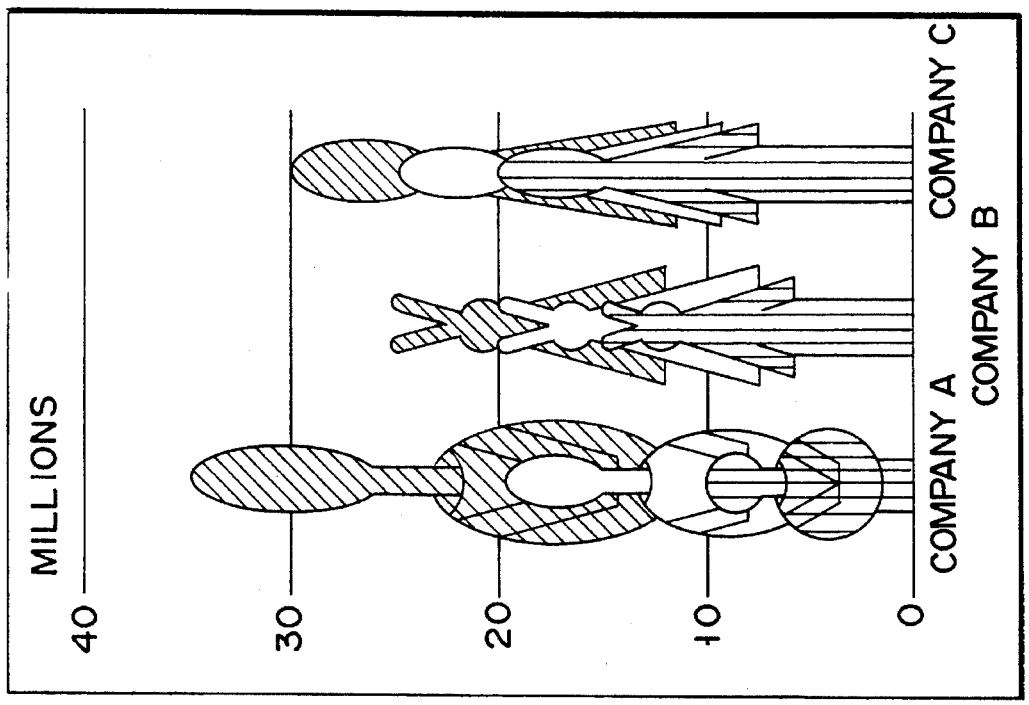

An output section 25 which is constituted by, e.g., a color graphic display or the like displays/outputs a presentation reference generated by the generating and processing section 23, as shown in FIG. 8. A display such as an overhead projector can be used as the output section 25.

As shown in FIG. 8, the generating and processing section 23 generates information contents (information in units of items) on the basis of knowledge and constraints stacked in the description style shown in FIGS. 5A through 7 as a practical picture constituting the presentation reference. The information components are output by a user and stacked in the description style shown in FIGS. 4A through 4C. The generating and processing section 23 outputs/displays the information contents through the output section 25.

An information management section 27 manages exchange of various pieces of information between the input section 15, a user input storage section 17, the element description storage section 19, the output element storage section 21, the generating and processing section 23, and the output section 25. The information management section 27 has a function of performing and controlling two- or three-dimensional graphic depiction. Under the management of the information management section 27, the above described sections are operated in relation to each other.

Figure 10A:
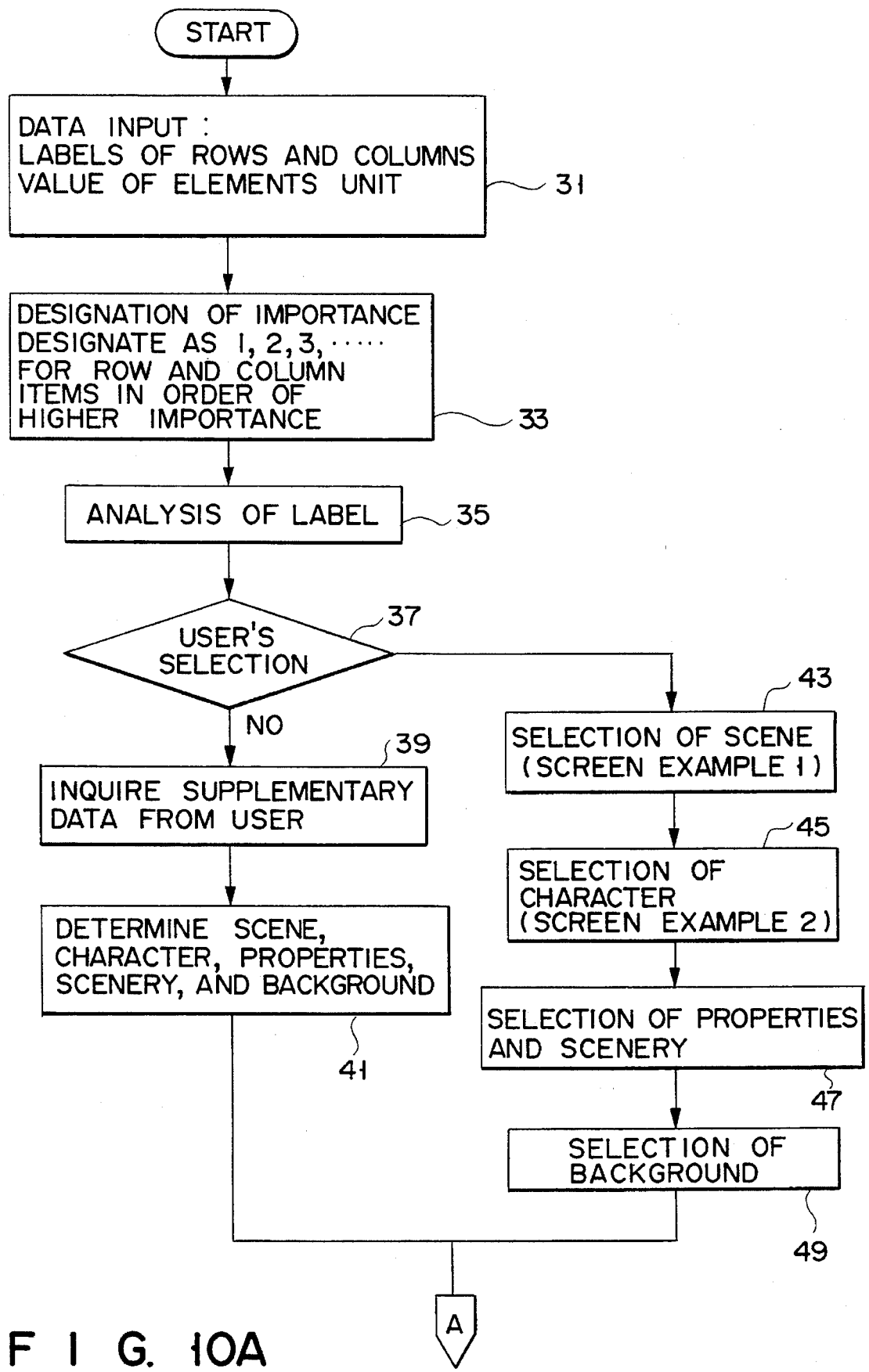

FIGS. 10A and 10B are flow charts showing a whole processing operation of the presentation support environment system and a method therefor.

In step 31, an operator inputs data related to a presentation reference. That is, labels of rows and columns are set, and the values (numerical data and character data) of elements corresponding to the labels are input. When the numerical data is input, a unit is input. In step 33, an importance of each of row and column items is designated. In this case, the row and column items are sequentially designated as "importance 1", "importance 2", "importance 3", . . . in an order of importance. The generating and processing section 23 shown in FIG. 2 analyzes the labels in step 35. This analysis is to be described later. In step 37, the generating and processing section 23 determines whether constrain conditions selected by the user are used or constrain conditions selected by the system in advance are used.

Figure 11:
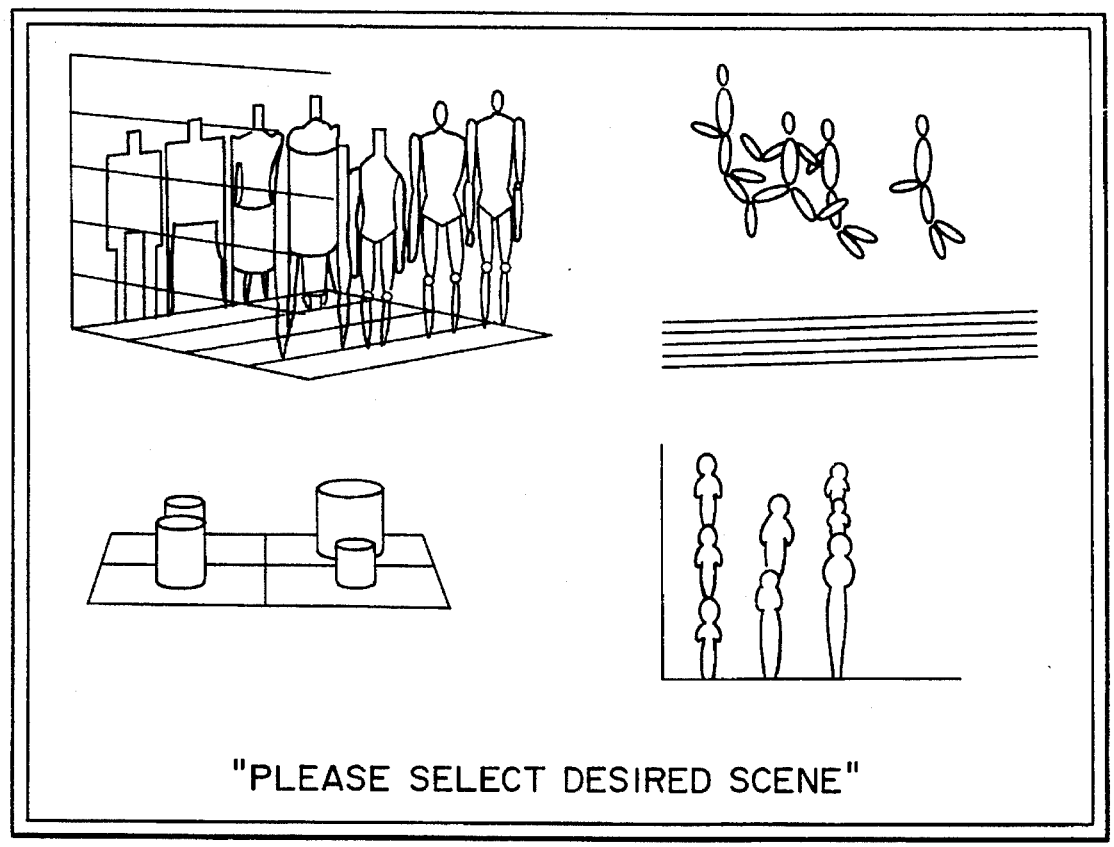
FIG. 11 is a view showing a display when a user selects his favorite background.
Figure 12:
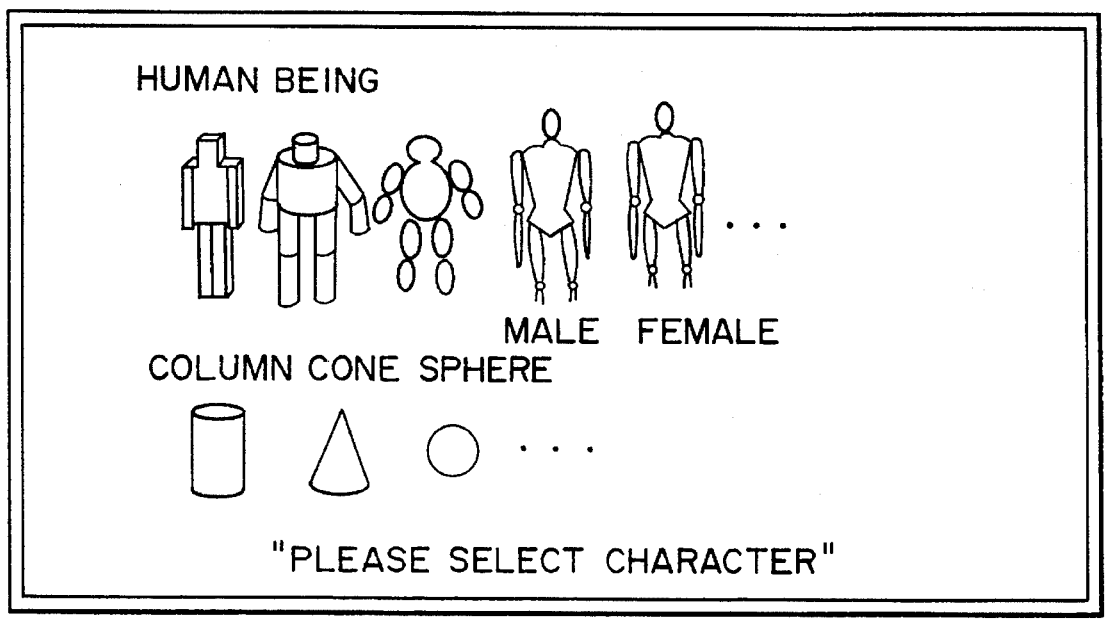
FIG. 12 is a view showing a display when a user selects his favorite characters.

When the constrain conditions selected by the user are used, the user selects pieces of component information. The pieces of component information includes pieces of information related to the position, shape, width, color, and length of graphic data. In step 43, the user selects a scene. For example, as shown in FIG. 11, a plurality of scenes are selected on the display 3, and the user selects a desired scene from the plurality of scenes. The user selects components. Note that a scene prepared by the user may be used. This operator selects a character in step 45. For example, as shown in FIG. 12, the user selects a desired character from a plurality of characters displayed on the display 3. In step 47, desired properties and a desired scenery are selected from a plurality of properties and sceneries displayed on the display 3. The properties are caps, racing numbers, batons, and the like of runners, and the sceneries are trees, rocks, mountains, etc., for example. In step 49, the user selects a desired background from a plurality of backgrounds displayed on the display 3.

When the constrain conditions are not selected by the user, in step 39, the generating and processing section 23 inquires supplementary information from the user. For example, in the selection of the scene, the section 23 inquires from the user information to determine which has higher priority, "time series" or "competition relation". Furthermore, in case of the selection of characters, the section 23 inquires which is to be selected "roundish" or "stiff", or "indoor" or "outdoor", and so on. In step 41, the generating and processing section 23 determines a scene, a character, properties, a scenery, and a background. In step 51, the generating and processing section 23 generates a structure file. This structure file is prepared based on the description shown in FIGS. 5A to 5C. The description style of the structure file is similar to that of FIGS. 5A to 5C. This structure file includes coordinates and identification data, for example, necessary for disposing on a display screen the scene, character, property, scenery, and background. In step 53, the generating and processing section 23 determines a view point. This determination of the view point is performed such that movement of a target point, movement of a view point position, a change in field angle (close-up or the like), extraction processing, translucent overlapping processing, and switching processing between a perspective projection and a parallel projection are properly selected. The transparent overlapping processing is used for comparing two or more objects by displaying them in semitransparent manner and overlapping them. In step 55, the generating and processing section 23 generates a view point file, which, in this embodiment, corresponds to view point positions shown in FIGS. 21A through 21C. In step 57, the data related to the presentation reference which includes numerical data and is input to the display 3 is displayed as multidimensional graphic data by the information management section 27. In this case, the multi-dimensional graphic data may be displayed by a still picture or an animation.

Figure 13:
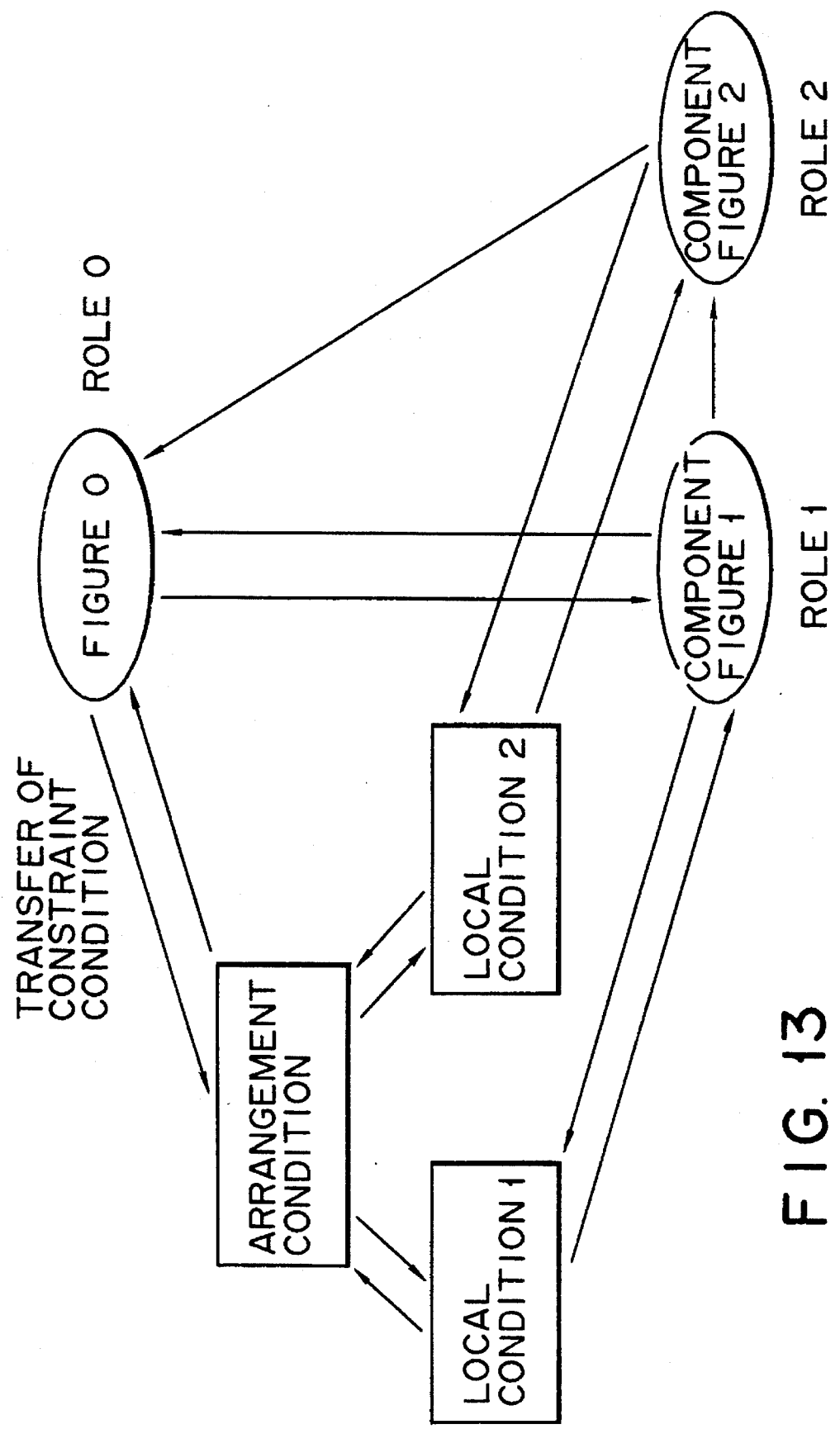
FIG. 13 is a schematic view showing a link for transferring constraints and a hierarchical link used when a multi-dimensional graph is hierarchically arranged by components.

In order to increase the number of types of multi-dimensional graphics, the multi-dimensional graphics may be hierarchically constituted by components, as shown in FIG. 13.

A generating and processing procedure of a presentation reference in the generating and processing section 23 will be described below.

Figure 14A:
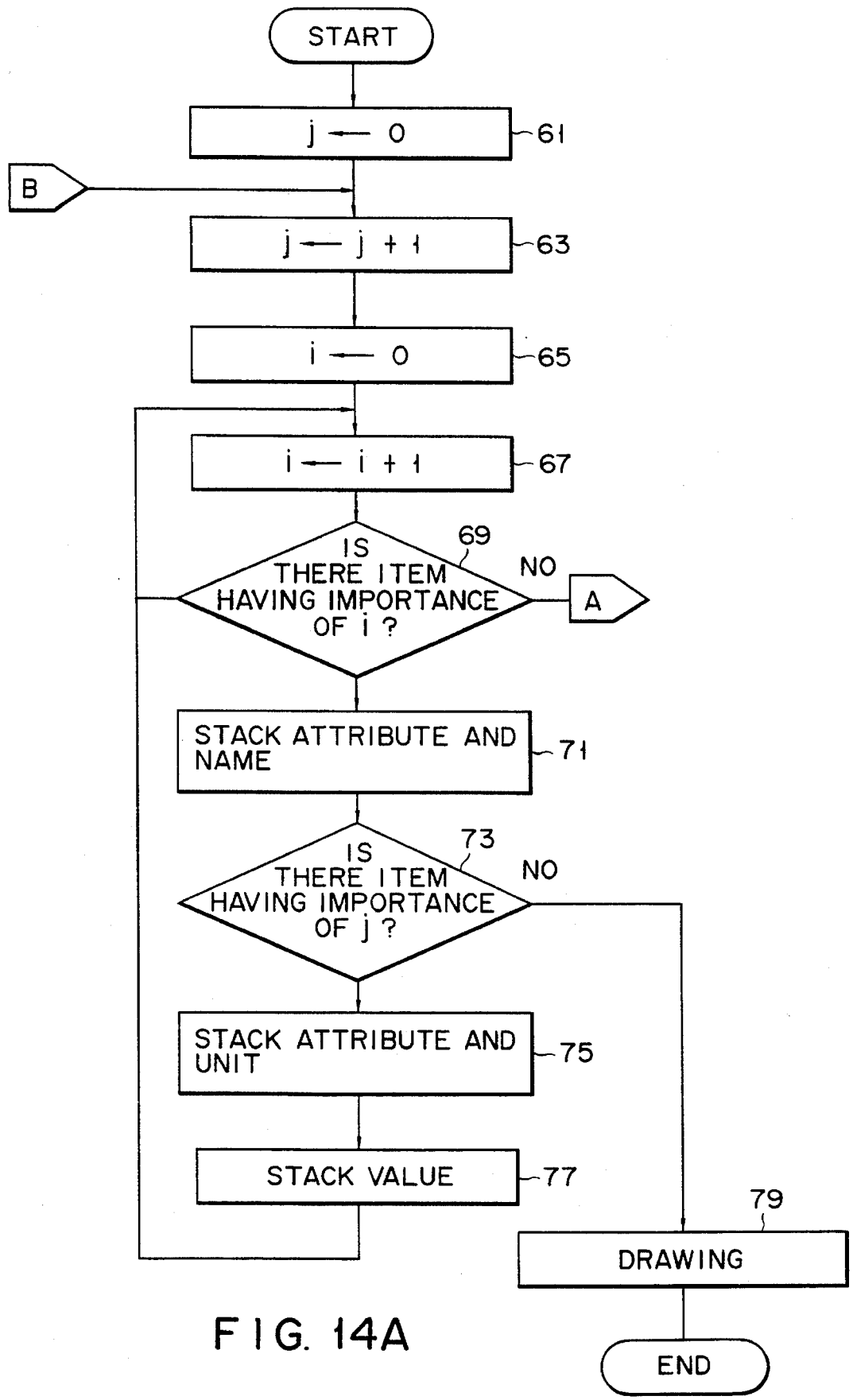
FIGS. 14A and 14B are flow charts showing an operation of a generating and processing section shown in FIG. 2.
Figure 14B:
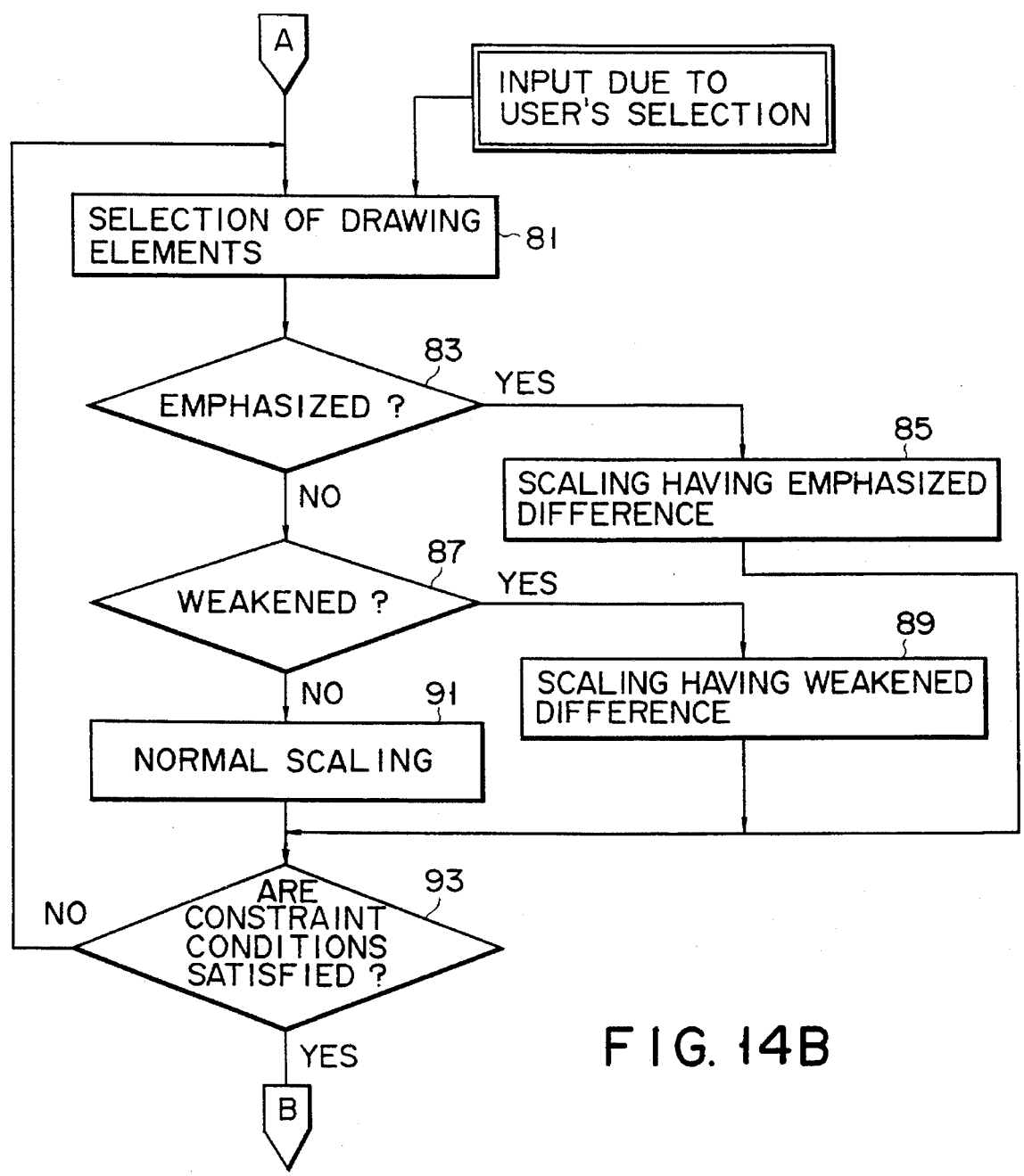

FIGS. 14A and 14B are flow charts showing the flow of a schematic processing procedure in the generating and processing section 23.

In this case, although it is described that a presentation reference is generated in accordance with the processing procedure shown in FIGS. 14A and 14B, the present invention is not limited to this processing procedure. For example, various pieces of information are described as a set of rules, and a presentation reference can be generated by utilizing this set.

The generating and processing procedure of the presentation reference shown in FIGS. 14A and 14B will be described below. First, parameters i and j representing importances are set (steps 61, 63, 65, and 67). When the parameters i and j are set by this procedure, the user input storage section 17 stacked in, e.g., a description style shown in FIGS. 4A through 4C, is retrieved, and information (user input information) set as an importance of "i" is searched (step 69). At the first point, at the present, since the parameter i is given as "1", item "company A" corresponds to the information, and the information is detected as information designated by the parameter i.

When the user input information designated by the parameter i is detected by a user input recording section 2, the information contents of the item are read out, and the information contents are temporarily stacked (step 71). In this case, name "company A" and attribute "enterprise" of item "company A" are calculated and temporarily stacked (step 71).

Thereafter, an item having an importance of "j" is retrieved from internal items of item "company A" in accordance with the parameter j (step 73). In this case, since the parameter i is given as "1", item "year: 1990" corresponds to the item having the importance of "j", and item "year: 1990" is detected as item information having an importance designated by the parameter j. When the item information designated by the parameter j by this processing, the contents of the item information are read out and temporarily stacked (step 75). In this embodiment, attribute "year" of item "year: 1990" and attribute "amount" of a unit are obtained, and these pieces of information are temporarily stacked. Thereafter, the content (value) of this item, e.g., "35", is stacked (step 77).

When the above processing procedure is finished, the flow returns to step 67, the parameter i is incremented, and the processing from step 69 is repeatedly performed. As a result, while the parameter i is set to be "2", the content (value) of item "year: 1990" of item "company B" is calculated as "25" in the same manner as described above. In addition, when the parameter i is incremented to be set to be "3", a value of "30" of item "year: 1990" of item "company C" can be calculated.

Thereafter, when the parameter is incremented and set to be "4", an item having an importance of i is retrieved in step 69. In this embodiment, since the item does not satisfy "i=4", the processing procedure is branched to a processing procedure of step 81 to be described later.

In step 81, it is determined whether there are elements corresponding to items "company A", "company B", "company C", "enterprise", "year", and "amount" temporarily stacked as described above with reference to the element description storage section 19 for stacking knowledge in, e.g., the description style shown in FIG. 6, and the elements are selected.

For example, knowledge shown in FIG. 15 is detected from the element description storage section 19. The knowledge is constituted by a rule for designating selection of a small classification corresponding to the above items or selection of a large classification corresponding to the items, a rule for designating selection of a small classification corresponding to attributes of the items or selection of a large classification corresponding to attributes of the items, and the like.

For example, when "rule 1" is applied to pieces of item information shown in FIG. 6, elements "turtle" and "rabbit" are obtained as a small classification corresponding to item "company A" and a small classification corresponding to item "company B", respectively. However, since there is no small classification corresponding to item "company C", "rule 4" is applied to item "company C", and element "human being" is selected as a small classification corresponding to attribute "enterprise" of item "company C".

Thereafter, "rule a" is applied by the knowledge shown in FIG. 16 and obtained from the element description storage section 19, and different elements, though they have the same attribute "enterprise", are selectively determined for items "company A", "company B", and "company C". As a result, as shown in a presentation reference generated in FIG. 8, the component elements "turtle", "rabbit", and "human being" for representing the contents of the items are selected for items "company A", "company B" and "company C", respectively, and generation of a presentation reference using these component elements in accordance with the item content is determined.

After selection of the component elements used for generating the presentation reference is determined, the flow inquires whether a presentation reference having an emphasized expression is generated or a presentation reference having a weakened expression is generated (steps 83 and 87). When a user designates and inputs an answer "no" in reply to the inquiry related to the expression, the values of the above items are scaled by normal scaling processing (step 91).

This scaling processing is performed to be described below.

For example, when the value of "25" of items "company A" and "year: 1990" is to be scaled, information related to item "turtle" is searched from the element description storage section 19 which describes knowledge in the style shown in FIGS. 5A through 5C. In this case, as the information related to item "turtle", it is described only that item "super class (master)" of item "turtle" is item "human being", any information required for scaling is not described. Therefore, it is assumed that the information required for scaling is succeeded from item "human being" which is the super class of item "turtle", and the description content of item "human being" in the element description section 3 is to be referred. At this time, component "height" constituting item "human being" is found out. In this case, a case wherein the component "height" is set to be a priority of "1" and a case wherein the component "height" is set to be a priority of "2" are simultaneously found out.

In the knowledge stacked in the element description section 19, the priority of "1" previously described is employed and determined as an object to be scaled in accordance with a series in which the priority of "1" is set. At this time, since the priority is set to be "1", the above value of "25" is applied as the content of the component "height", and the scale (size) of the height is determined. Similarly, the above scaling (determination of the size of an element) is performed to items "company B" and "company C".

In this stage, only element "height" is determined, and the sizes of other components and the like are not determined.

In step 93, component elements "leg", "hand", "head", and "trunk" of lower levels constituting the component element "human being" are sequentially determined to satisfy constrain conditions set to the component element "human being". Note that in the knowledge information shown in FIGS. 5A through 5C, constraints having marks (*) are not necessarily applied to the scaling processing of the above component elements.

After the contents (values) of items "year: 1990" of items "company A", "company B", and "company C" are scaled as described above, it is determined whether the scaling results satisfy the above constrain conditions (step 93). If NO in step 93, the procedure started from selection processing of the component elements shown in step 81 is performed again.

If YES in step 93, the flow returns to step 63, and the parameter j is incremented. The contents of items "year: 1985" of items "company A", "company B", and "company C" are calculated in the same manner as described above, and the values of the items obtained by the processing procedure are applied to the component elements so as to be scaled. Similarly, the item contents of items "year: 1980" of items "company A", "company B", and "company C" are calculated, and the values of the items are applied to the component elements to be scaled as described above.

Finally, since no item having the importance of j shown by the parameter j is detected (step 73), while the contents of the output element storage section 21 described in, e.g., the style shown in FIG. 6 are referred, the above components constituting a presentation reference are connected to generate the presentation reference. The presentation reference is graphically output as shown in FIG. 7 (step 79). At this time, when no condition is specially designated, since the default of the presentation reference is set to be "normal", connection processing is performed to connect component elements "rabbit", "turtle", "human being", and the like in standing states in accordance with a function representing connection, thereby generating a picture constituting the presentation reference.

When a user (presenter) desires the above presentation reference generated as shown in FIG. 8, an alternate plan is input in step 81 of the above procedure shown in FIG. 14B.

In this processing, a rule b shown in FIG. 16 is selected, and instruction "same element is applied for same attribute" is designated. In this embodiment, the same element "human being" is applied for the same attribute. As a result, the presentation reference shown in FIG. 9 is generated.

In the knowledge information shown in FIGS. 5A through 5C, when another priority is used, component "leg" is selected in place of component "height". Since component "height" has only component "length", component "length" is scaled. However, component "leg" is constituted by components "length", "width", "color", and "shape". The priority of component "length" of the components is set to be "1", and a degree which can express the quantity of component "length" is set to be "2" which has a higher priority than component "length". It is determined to scale "length of leg". As a result, the above knowledge information is generated as, e.g., a presentation reference shown in FIG. 9, and graphically output.

When a value to be scaled is not "quantity" but "quality", the component element is scaled using other components such as "color" in place of "length of leg".

In step 83 of the processing procedure shown in FIGS. 14A and 14B, when it is detected that a presentation reference having an emphasized expression is designated, scaling having an emphasized difference is started in step 85. In this scaling having the emphasized difference, in the generating and processing section 23, the scaling is emphasized with reference to rules related to the emphasized expressions shown in FIG. 17. The rules of the emphasized expressions shown in FIG. 17 are given as "discriminate against expression" "discriminate against color", "scaling based on difference", "put view point at goal position", and the like. Therefore, when a rule α is applied, i.e., when "discriminate against expression" is selected, as shown in FIG. 20, a presentation reference prepared by applying this rule is a picture having components each of which has variation in expression.

Figure 20:
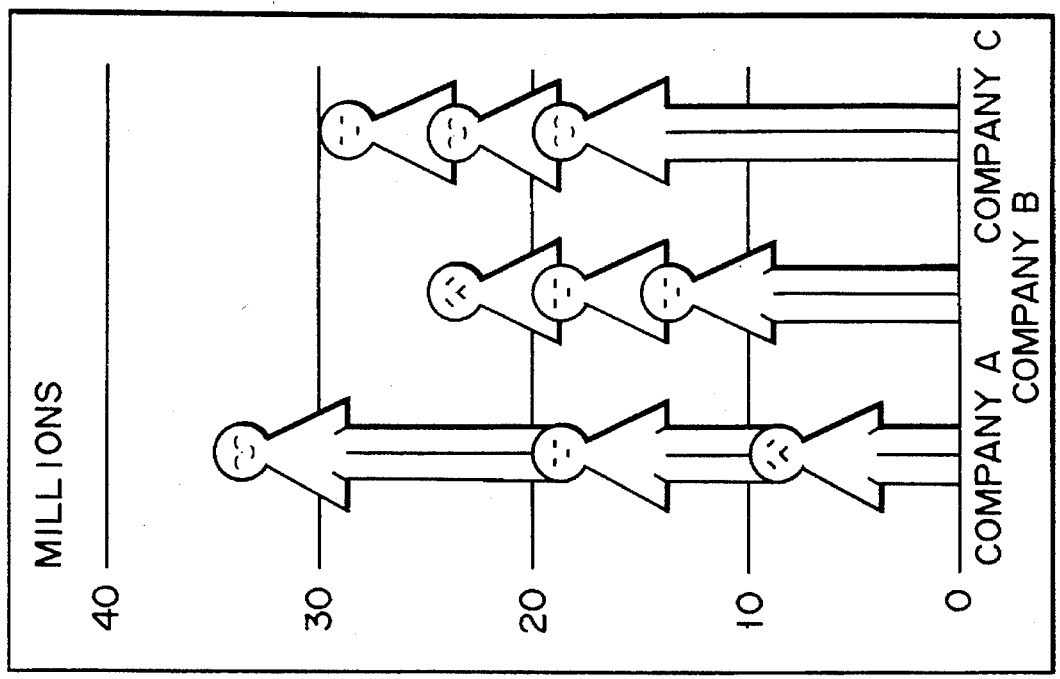
FIGS. 19 through 21C are views showing prepared presentation references.
Figure 19:
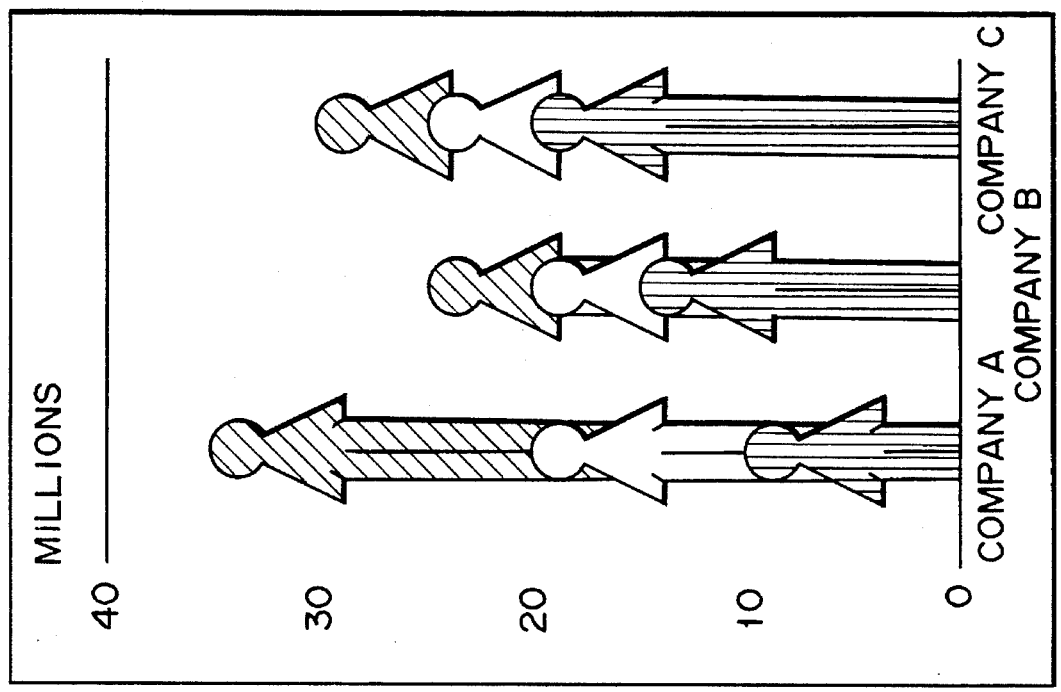

In the presentation reference shown in FIG. 20, the expressions of component element "face" are changed in an order of larger values every year. In addition, for example, expressions can be changed in accordance with the magnitude of a ratio of this year to last year.

In step 51, when "rule 2" or "rule 4" shown in FIG. 15 is applied to designate "apply large classification", a component element is determined at random or by selection of a user from elements corresponding to a large classification having a selected attribute on the basis of the description of knowledge shown in FIGS. 5A through 5C.

For example, when "living thing" is selected as the large classification, element "human being" having "living thing" as an attribute and elements "turtle" and "rabbit" each having the attribute of element "human being" are obtained as the corresponding elements. As a result, a component element constituting a presentation reference is selected from the three elements, thereby increasing a degree of selection. When "rule γ" and "rule δ" are applied as rules of an emphasized expression, since "scaling based on difference" and "put view point at goal position" are designated, and the presentation reference expressed as shown in FIG. 21A is changed into the presentation reference expressed as shown in FIG. 21B, thereby emphasizing the difference between the presentation references.

Figure 21A:
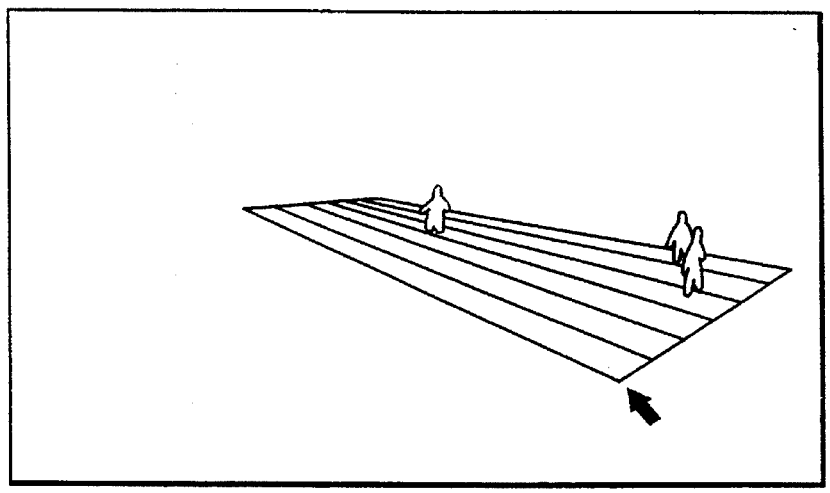
Figure 21B:
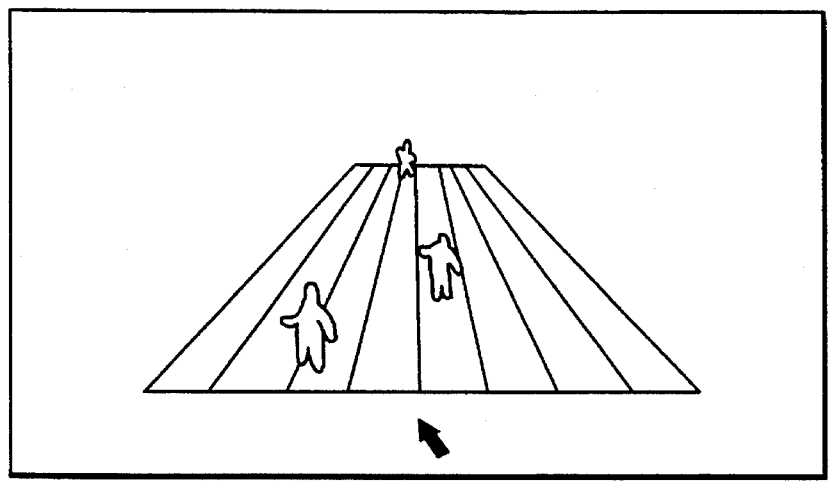
Figure 21C:
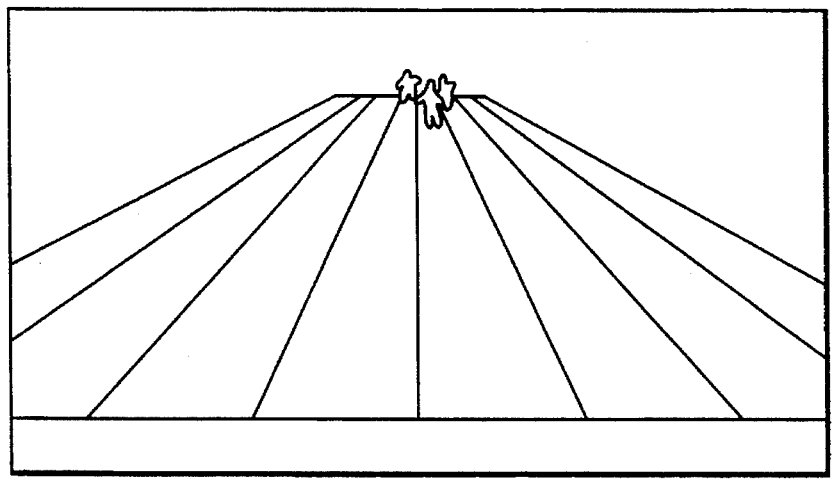

In contrast to this, when it is designated to weaken an expression, rule A "put view point at start position" is applied, and the presentation reference expressed as described in FIG. 21A is changed into that shown in FIG. 21C in accordance with a change in view point position. As a result, a difference between values of elements represented by using component "human being" is not to be conspicuous.

In order to graphically prepare the presentation references shown in FIGS. 2A through 21C, "course" serving as a base is selected first. However, a component element which can appear on "course" is "Runner", as is apparent from the description of knowledge shown in FIGS. 5A through 5C. Since component "human being" can represent "Runner" or "Bar" as "role", "human being", "turtle", and "rabbit" can appear on "course".

An element is selected from the three elements such that the rules shown in FIGS. 15 and 16 are properly applied. A scenery and properties which can be arranged on "course" are selected using the same manner as described above such that rules are properly applied. As a result, a presentation reference in which a component element such as "human being" is arranged on "course" having a view point as a criterion can be effectively prepared.

The present invention is not limited to the above embodiment. For example, a presentation reference can be expressed as an animation by moving "Runner" on "course" in accordance with time series data. In this case, a view point position is described as rules represented as a table shown in FIG. 22. A highly natural presentation reference can be graphically described by referring to the rules. A description of knowledge is not limited to that of the above embodiment, and the description of knowledge can be variously changed in accordance with specifications for a presentation reference.

Additional advantages and modifications will readily occur to those skilled in the art. Therefore, the invention in its broader aspects is not limited to the specific details, representative devices, and illustrated examples shown and described herein. Accordingly, various modifications may be without departing from the spirit or scope of the general inventive concept as defined by the appended claims and their equivalents.

What is claimed is:

1. A presentation support environment system, comprising:

means for storing input data including numerical data;

means for inputting constraint conditions for displaying the input data as a presentation reference, the constraint conditions including a component, a background, and a size of the component used when the input data is displayed as the presentation reference, said means for inputting the constraint conditions including means for designating a degree of importance of the input data, the degree of importance indicating which components are preferred for a type of format, wherein the background is chosen from a plurality of backgrounds that is suitable for a particular application;

means for generating the presentation reference from the input data in accordance with the constraint conditions and including a function of automatically changing sizes of other associated components, based on the constraint conditions, when one component is changed; and means for displaying the generated presentation reference.

2. A system according to claim 1, wherein said means for inputting the constraint conditions includes means for inputting pieces of information of a type, arrangement, connection movement of graphic data, and enlargement and reduction of scale including changing a portion of the graphic data, displayed as the presentation reference.

3. A system according to claim 1, wherein said means for inputting the constraint conditions includes places of information of a scene, a character, properties, a scenery, a background, and enlargement and reduction of scale and partial change of the character.

4. A system according to claim 1, further comprising:

means for designating a degree of importance of the input data, and wherein said means for generating presentation reference includes means for generating presentation reference in an order of higher degree of importance.

5. A system according to claim 1, wherein said means for generating the presentation reference includes means for determining a view point used when the presentation reference is displayed, determination of the view point including selection of a target point, movement of a view point position, a change in field angle, extracting processing, translucent overlapping processing, and switching processing between a perspective protection and a parallel protection.

6. A system according to claim 1, wherein said means for displaying the presentation reference includes means for displaying data by graphic animation of an individual said element with reference to what was previously displayed.

7. A system according to claim 1, wherein said means for displaying the presentation reference includes means for performing blinking display and highlighting display.

8. A system according to claim 1, wherein said means for displaying the presentation reference includes means for performing zoom-up display and partial extraction display.

9. A presentation support environment system, comprising:

means for storing plural types of pieces of a component and a background information constituting a presentation reference;

means for inputting drawing element information including a degree of importance of each item and an item to be emphasized, said degree of importance indicating which components are preferred for a type of format;

means for selecting the component, a size of the component and the background information on a basis of the drawing element information, wherein the background is chosen from a plurality of backgrounds that is suitable for a particular application;

means for mapping input data in accordance with a degree of expression of numerical data of the selected component, the size of the component and the background; and means for displaying the mapped data.

10. A system according to claim 9, further comprising:

means for converting a logically important view point of the mapped input data into a physical view point and displaying the physical view point;

wherein, determination of the physical view point includes selection of a target point, movement of the logically important view point position, a change in field angle, extracting processing, translucent overlapping processing, and switching processing between a perspective projection and a parallel projection.

11. A system according to claim 9, wherein said mapping means includes means for generating a mapping axis of a length, a width, a height, an expression, a color, a texture, a direction, an angle, and an area.

12. A presentation support environment system for generating and displaying a presentation reference from input data including numerical data, comprising:

means for inputting constraint conditions used when the input data is displayed, the constraint conditions including at least pieces of information of a component, a size of the component and a background used when the input data is displayed as the presentation reference, said means for inputting the constraint conditions including means for designating a degree of importance of the input data, said degree of importance determining which components are selected for a type of format based on an operator's taste;

means for hierarchically arranging the components constituting the presentation reference and for forming a first link for linking the components each layer;

means for forming a second link for linking constraint conditions for each layer;

means for combining components of each corresponding layer on the basis of the input constraint conditions and generating the presentation reference; and means for displaying the generated presentation reference.

13. A presentation support environment system comprising:

input means for inputting information of a presentation reference;

user input description storage means for stacking the information of the presentation reference input by said input means in a description style which can be processed by generating and processing means;

element description storage means for stacking natures and constraints of a component, a size of the component and a background constituting the presentation reference in the description style which can be processed by said generating and processing means, said element description storage means including means for designating a degree of importance of the input data, said degree of importance indicating which components are preferred for a type of format, wherein the background is chosen from a plurality of backgrounds that is suitable for a particular application;

output element storage means for stacking pieces of information of the components, the size of the component and the background stacked in said element description storage means in a style capable for outputting and displaying the pieces of information;

generating and processing means for converting the information and the presentation reference stacked in said user input description storage means into parameters for specifying the components, the size of the component and the background stacked in said output element storage means such that the constraints of the components, the size of the component and the background are satisfied, on the basis of the nature of the component and background stacked in said element description storage means, said generating and processing means includes a function of automatically changing sizes of associated other components, based on the constraint conditions, to be tailored to the size of the component inputted; and output means for extracting the pieces of information of the components, the size of the component and the background from said output element storage means in accordance with the parameters generated by said generating and processing means, thereby generating and outputting the presentation reference.

14. A system according to claim 13, wherein the information related to the presentation reference input from said input means is constituted by an item name of a reference to be presented and attribute values including length, width, height, color, expression, and shape of the item name, a background reference for supplementing the item name and attribute values, and information such as a preference and an intention related to a stream of presentation, a degree of expression.

15. A system according to claim 13, wherein said generating and processing means includes means for converting an attribute value of each item stacked in said user input description storage means in accordance with a preference and an intention related to an explaining and expression method input by a user on the basis of natures of components, sizes of components and backgrounds are satisfied, and a conversion result serves as parameters for specifying the components and backgrounds stacked in the output element storage means.

16. A method for displaying a presentation reference from input data including numerical data, in a presentation support environment system comprising the steps of:

a) inputting constraint conditions used when said input data is displayed, the constraint conditions including at least pieces of information related to a component, sizes of the component and a background used when the input data is displayed as the presentation reference, said inputting constraint conditions step including designating a degree of importance of the input data preferred for a type of format, wherein the background is chosen from a plurality of backgrounds that is suitable for a particular application;

b) generating the presentation reference from the numerical data on the basis of the input constraint conditions, the generating step including a step of automatically changing sizes of associated components, based on the constraint conditions, to be tailored to the input size of the components; and c) displaying the generated presentation.

17. A method according to claim 16, wherein the constraint conditions include pieces of information of a type, arrangement, connection, movement and reduction and enlargement of scale and partial change of the presentation reference.

18. A method according to claim 16, wherein the constraint conditions include pieces of information of a scene, a character, properties, a scenery, and a background constituting the presentation reference, the character information including a length, a width, a height, a color and an expression.

19. A method according to claim 16, wherein the step of inputting the constraint conditions includes the step of designating a degree of importance of the input data, and the step of generating the presentation reference in an order of higher degree of importance.

20. A method according to claim 16, wherein the step of generating the presentation reference includes the step of determining a view point used when the presentation reference is displayed determination of the view point including selection of a target point, movement of a view point position, a change in field angle, extraction processing, translucent overlapping processing, and switching processing between a perspective projection and a parallel protection.

21. A method according to claim 16, wherein the step of displaying the presentation reference includes the step of displaying the presentation reference by computer animation.

22. A method according to claim 16, wherein the step of displaying the presentation reference includes the step of performing blinking display and highlighting display.

23. A method according to claim 16, wherein the pieces of component information include pieces of information of a position, a shape, a width, a color, a length, a height and an expression which are arbitrarily changed.

24. A method according to claim 16, wherein the step of displaying the presentation reference includes the step of performing zoom-up display and partial extraction display.

25. A method for displaying input data including numerical data as a presentation reference in a presentation support environment system, comprising the steps of:
 a) inputting drawing element information including a degree of importance of each item of drawing element information and input data, the degree of importance indicating which components are preferred for a type of format;
 b) selecting components, a size of a component and a background on a basis of the drawing element information, the background may be chosen from a plurality of backgrounds that is suitable for a particular application;
 c) mapping the input data in accordance with a degree of expression of numerical data of the selected components, the size of the component and the background; and
 d) displaying the mapped data.

26. A method according to claim 22, further comprising:
 a step of converting a logically important view point of the mapped input data into a physical view point and displaying the physical view point;
 wherein, determination of the physical view point includes selection of a target point, movement of the logically important view point, a change in field angle, extracting processing, translucent overlapping processing, and switching processing between a perspective projection and a parallel projection.

27. A method according to claim 26, wherein the step of mapping the input data includes the step of determining a mapping axis of a length, a height, an expression, a width, a color, a texture, a direction, an angle, and an area.

28. A method for generating and displaying a presentation reference from input data including numerical data, in a presentation support environment system, comprising the steps of:
 a) inputting constraint conditions used when the input data is displayed, the constraint conditions including at least pieces of information of a component, a size of the component and a background used when the input data is displayed is the presentation reference, said inputting constraint conditions step including a step for designating a degree of importance of the input data, the degree of importance determining which components are preferred for a type of format;
 b) hierarchically arranging the components constituting the presentation reference and forming a first link for linking the components of each layer;
 c) combining components of the corresponding layer on the basis of the constraint conditions input in the step a) and generating the presentation reference; and
 d) displaying the generated presentation reference.

29. A presentation support environment system for converting tabulated data into a presentation with a variable format, comprising:
 an input section for inputting items of a table having rows and columns to be presented including labels and numerical data, said input section also for inputting data relating to a desired said format;
 a user input storage section storing said items of the table and sequentially assigning degrees of importance to each of said items according to their appearance in said table;
 an element description storage section storing constraints, said constraints being definitions of elements, which may be displayed in the presentation, each element being made up of associated components, said definitions relating sizes, colors and backgrounds of the associated components;
 a description style table stored in the element description storage section tabulating preferred elements for representing said items of the table;
 an output element storage section storing a position of said elements to be displayed in said presentation;
 a connection table controllable by a user specifying the connection between said associated components of each said element;
 a generating and processing section generating said presentation based on the output element storage section and the description style table;
 an output section displaying said presentation from the generating and processing section;
 an information management section controlling flow of data between all sections in the presentation support environment system; and
 wherein, any component of the elements displayed in the presentation may be changed after the presentation is generated by the output section and the elements in the presentation will change according to the definitions relating the associated components, thus changing the format of the presentation.

30. The presentation support environment system of claim 29, wherein the elements include graphic illustrations of living creatures and the components include graphic illustrations of limbs of said graphic illustrations of living creatures.

* * * * *